(12) United States Patent
Hartelius

(10) Patent No.: US 6,419,547 B1
(45) Date of Patent: Jul. 16, 2002

(54) TILT AND TURN UNDERCARRIAGE APPARATUS

(75) Inventor: Mark E. Hartelius, Tinley Park, IL (US)

(73) Assignee: Strombecker Corporation, Chicago, IL (US)

( * ) Notice: Subject to any disclaimer, the term of this patent is extended or adjusted under 35 U.S.C. 154(b) by 0 days.

(21) Appl. No.: 09/535,848

(22) Filed: Mar. 27, 2000

(51) Int. Cl.[7] ............................................... A63H 17/36
(52) U.S. Cl. ........................................ 446/468; 446/469
(58) Field of Search ................................ 446/431, 448, 446/465, 468, 469

(56) References Cited

U.S. PATENT DOCUMENTS

| | | | | |
|---|---|---|---|---|
| 4,021,961 A | * | 5/1977 | Good | .......................... 446/469 |
| 4,762,511 A | | 8/1988 | Lee et al. | |
| 4,850,929 A | | 7/1989 | Genevey | |
| 4,861,311 A | | 8/1989 | Alskog | |
| 5,102,367 A | | 4/1992 | Mullaney et al. | |
| 5,228,880 A | | 7/1993 | Meyer et al. | |
| 5,449,311 A | * | 9/1995 | Williams | ...................... 446/468 |
| 5,549,501 A | * | 8/1996 | Jow | ............................ 446/460 |

* cited by examiner

Primary Examiner—Jacob K. Ackun
(74) Attorney, Agent, or Firm—Jones, Day, Reavis & Pogue

(57) ABSTRACT

An undercarriage for a vehicle such as a toy truck or an adult size riding vehicle where the undercarriage allows a vertically directed tilt force to engender a turning movement of the wheels. The undercarriage is simply constructed of two spaced apart brackets having oblique slots through which an axle running between the wheels pass. The axle is also engaged by a fulcrum located midway between the brackets and two biasing tabs which are located between the fulcrum and each of the brackets. In straight ahead movement, the axle is slightly biased by the tabs to be located about the mid-point of the slots. However, when a tilt force is applied to the vehicle, then the axle will move to a lower portion of one of the slots and the upper portion of the other slot. At the same time one of the tabs is flexed so as to increase its biasing force on the axle. When the tilt force is removed, the biasing force of the tab pushes the axle to its mid-point position in the slots.

20 Claims, 5 Drawing Sheets

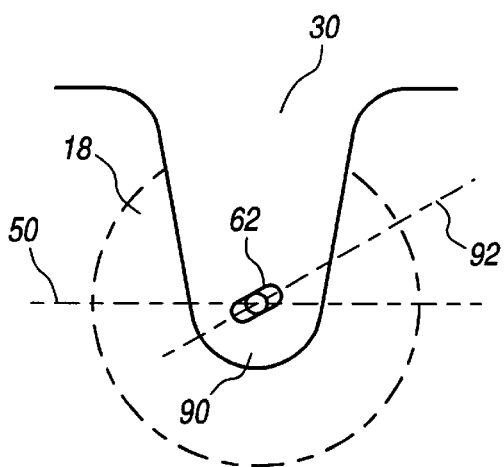
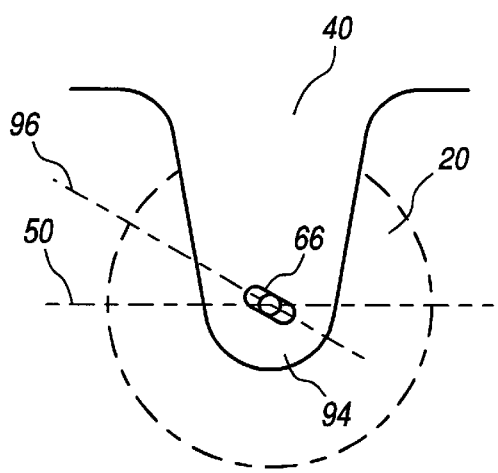
FIG. 7    FIG. 8
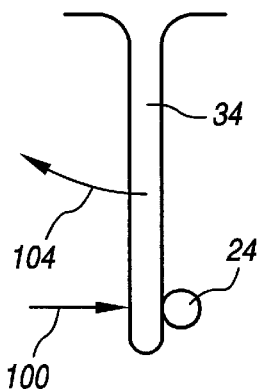
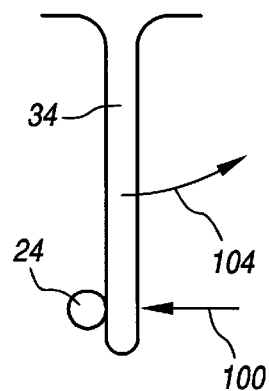
FIG. 9    FIG. 10
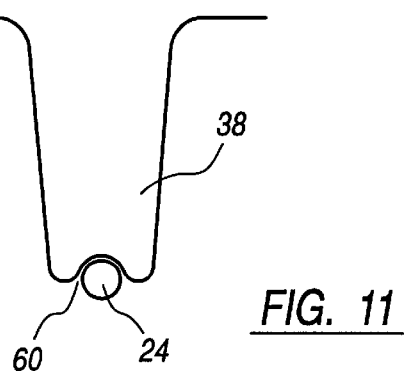
FIG. 11

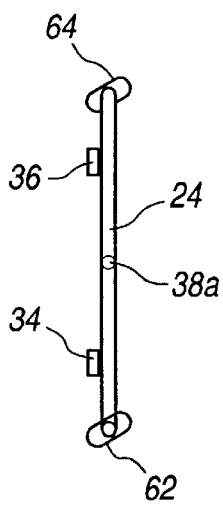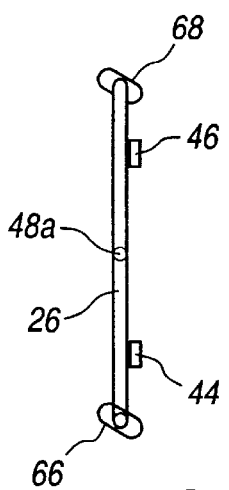
FIG. 12
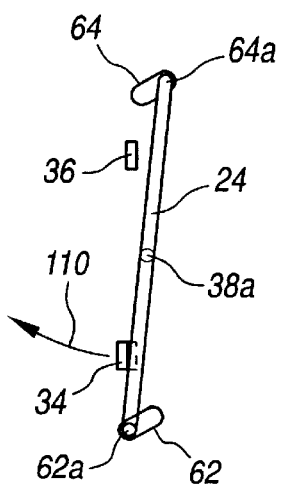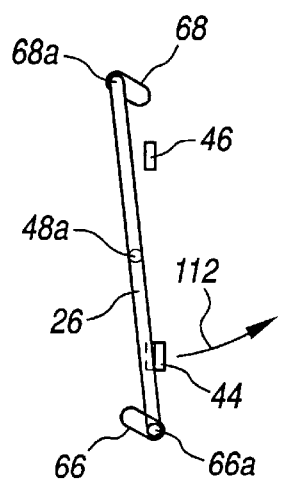
FIG. 13          FIG. 14
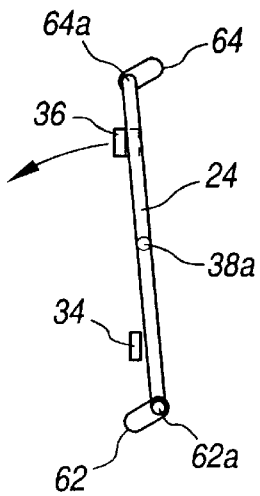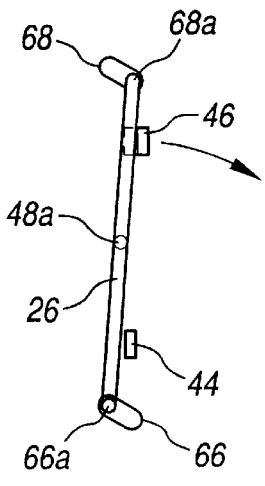
FIG. 15          FIG. 16

TILT AND TURN UNDERCARRIAGE APPARATUS

BACKGROUND OF THE INVENTION

1. Field of the Invention

The present invention relates to a tilt and turn undercarriage apparatus and more particularly to an undercarriage apparatus having the capability of self-turning when a force is provided to tilt the apparatus.

2. Description of the Related Prior Art

Movable devices, from toys to fall size vehicles, typically have some mechanism to allowing them to accomplish a turn. Most have a steering mechanism that is directly fastened to an axle such as the arrangement on a Radio Flyer brand wagon. Another direct steering arrangement is exemplified by a snow sled where a slight twist to the leading edges of the sled runners cause the sled to move in a predetermined manner. Still other vehicles have multi-element linkages and rack and pinion gear arrangements, such as on a fall scale automobile or on remote control toy vehicles.

The prior related art shows toy undercarriages with various configurations for achieving height adjustment, wheel movements, ease of construction and climbing enhancement. For example, see U.S. Pat. Nos.: 4,850,929; 4,762,511; 4,861,311; 5,102,367; and 5,228,880. The prior related art, however, does not show a simple, reliable tilt and turn mechanism.

BRIEF DESCRIPTION OF THE INVENTION

What is described here is an undercarriage or tilt and turn apparatus for a vehicle adapted to move on a surface comprising in combination a pair of spaced apart surface engaging elements, an axle connecting the pair of spaced apart surface engaging element, a base having a bottom surface, first and second spaced apart brackets mounted to the bottom surface of the base, each of the brackets having an extended end portion, an oblique slot formed in the extended end portion of each of the brackets, each slot having a lower and an upper portion thereof wherein the axle passes through the slots formed in each of the brackets and is constrained to move within the slots, a fulcrum mounted to the bottom surface of the base between the first and second spaced apart brackets and engaging the axle for allowing the axle to pivot about the fulcrum, and first and second biasing elements connected to the bottom surface of the base for biasing the axle, the first biasing element being located to one side of the fulcrum along the axle and the second biasing element being located to the other side of the fulcrum along the axle.

An object of the present invention is to provide and tilt and turn apparatus which is simple, reliable and inexpensive. Another aspect of the present invention is to provide a tilt and turn apparatus as an undercarriage for a vehicle which allows the vehicle to be moved in a straight ahead manner and by tilting the vehicle to one side or the other have the vehicle move in the direction of the tilt force. A further advantage of the present invention is to provide a tilt and turn apparatus which is automatically turned by the application of a tilt or vertical force. Another aim of the present invention is to provide a device with self-turning wheels, skis, runners or other ground contacting elements when a vertical force component acts upon the device. This can occur by use of a hand if the device is a toy, or if a larger vehicle, by the shift in body weight of a rider.

A more complete understanding of the present invention and other objects, aspects, aims and advantages thereof will be gained from a consideration of the following description of the preferred embodiments read in conjunction with the accompanying drawings provided herein.

BRIEF DESCRIPTION OF THE SEVERAL VIEWS OF THE DRAWINGS

FIG. 7 is an enlarged partial side elevation view of a front bracket of the toy vehicle taken along line 7—7 of FIG. 3.

FIG. 8 is an enlarged partial side elevation view of a rear bracket of the toy vehicle of FIGS. 1–3.

FIG. 9 is a enlarged partial side elevation view of a front biasing tab taken along line 9—9 of FIG. 3.

FIG. 10 is an enlarged partial side elevation view of a rear biasing tab of the toy vehicle of FIGS. 1–3.

FIG. 11 is an enlarged partial side elevation view of a fulcrum taken along line 11—11 of FIG. 3.

FIG. 12 is a diagrammatic perspective view of the front and rear axles of the toy vehicle shown in FIGS. 1–3 showing the positions of the axles during straight ahead steering.

FIG. 13 is a diagrammatic perspective view of the front axle of the toy vehicle of FIGS. 1–3 in position during a rightward turn.

FIG. 14 is a diagrammatic perspective view of the rear axle of the toy vehicle show in FIGS. 1–3 in position during a rightward turn.

FIG. 15 is a diagrammatic perspective view of the front axle of the toy vehicle shown in FIG. 1–3 in position during a leftward turn.

FIG. 16 is a diagrammatic perspective view of a rear axle of the toy vehicle shown in FIGS. 1–3 in position during a leftward turn.

DETAILED DESCRIPTION OF THE INVENTION

Figure 1:
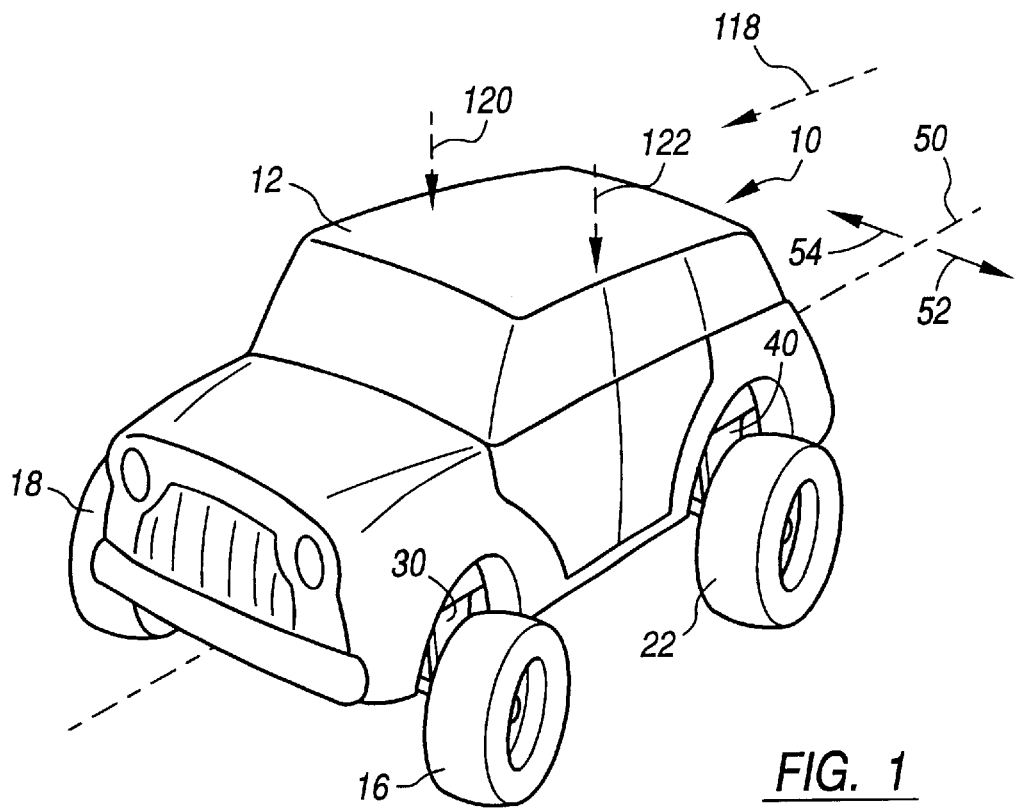
FIG. 1 is an upper perspective view of a toy vehicle having the tilt and turn undercarriage apparatus.

While the present invention is open to various modifications and alternative constructions, the preferred embodiments shown in the drawings will be described herein in detail. It is understood, however, that there is no intention to limit the invention to the particular forms disclosed. On the contrary, the intention is to cover all modifications, equivalent structures and methods, and alternative constructions falling within the spirit and scope of the invention as expressed in the appended claims.

Figure 2:
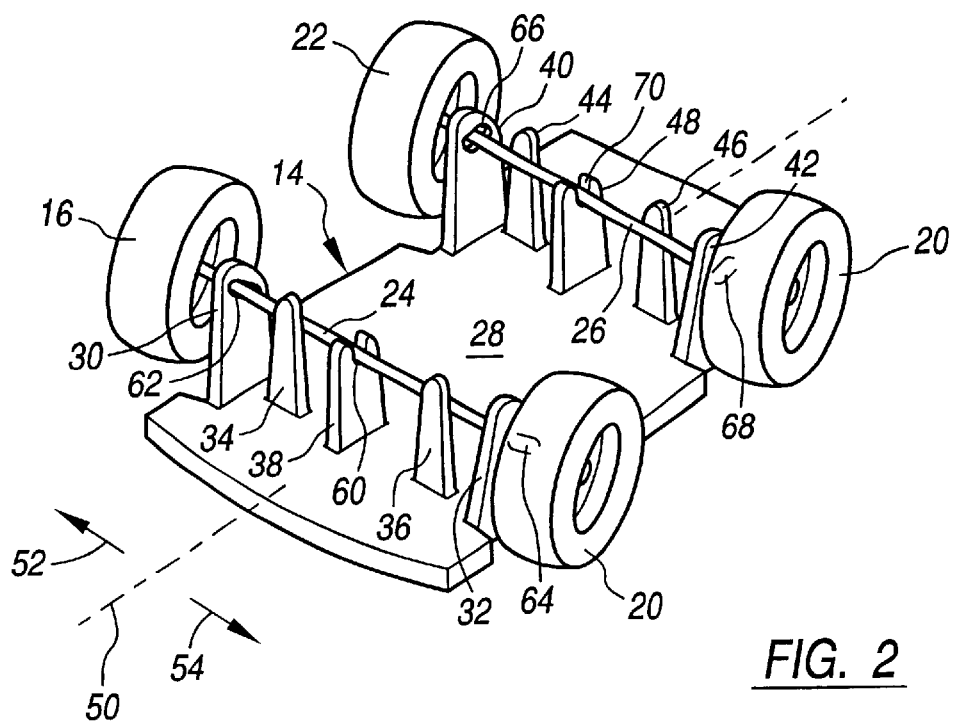
FIG. 2 is a bottom perspective view of the toy vehicle shown in FIG. 1.
Figure 3:
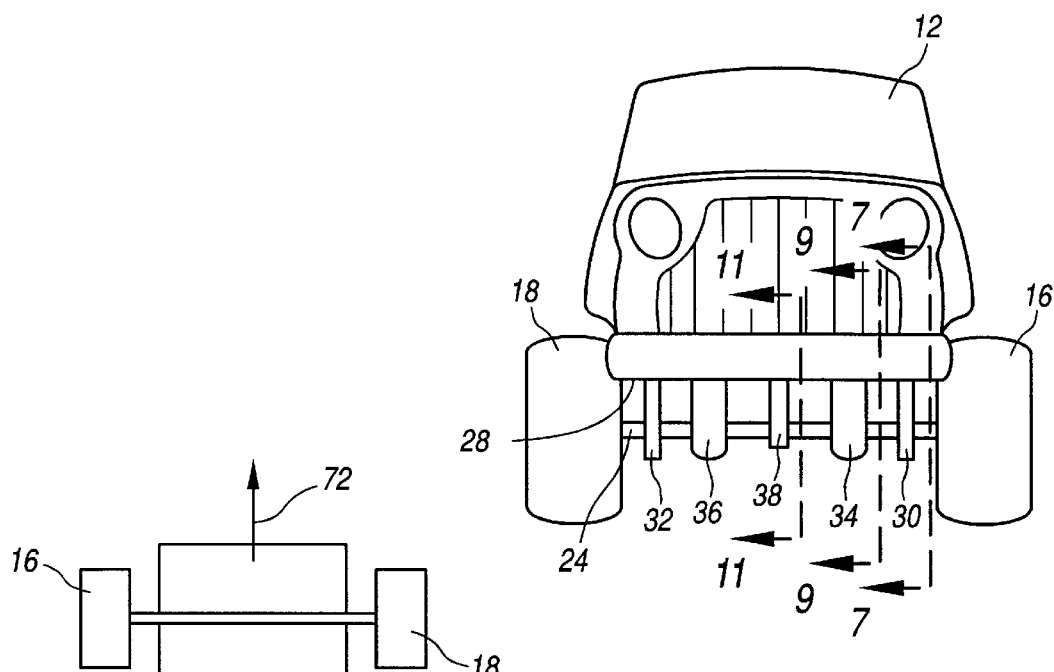
FIG. 3 is a front elevation view of the toy vehicle shown in FIGS. 1 and 2.

Referring now to FIGS. 1, 2 and 3, there is illustrated a toy vehicle 10 having a body 12 connected to a base 14. Supporting the body and base above the ground or a surface on which the vehicle moves are a pair of spaced-apart surface engaging elements in the form of two front wheels 16, 18 connected by a first or front axle 24 and a second pair of spaced-apart surface engaging elements in the form of two rear wheels 20, 22 connected by a second or rear axle 26. The surface on which the vehicle moves is designated 27. Connected to a bottom surface 28 of the base 14 is a first or left bracket 30 and a second or right bracket 32, a first or left biasing element or tab 34 and a second or right biasing element or tab 36, and a centrally located projection or fulcrum 38. At the rear of the vehicle is a very similar 102 arrangement. There are first and second brackets, such as a left bracket 40 and a right bracket 42, connected to the bottom surface 28, as well as a first or left biasing element or tab 44 and a second or right biasing element or tab 46 and a centrally located fulcrum 48. Each bracket, tab and fulcrum is integral with the base and may be molded together using a suitable synthetic resin thereby minimizing manufacturing costs and enhancing reliability.

For purposes of direction a longitudinal axis of the base and the vehicle is designated 50. A leftward direction is signified by an arrow 52 and a rightward direction is signified by an arrow 54.

As best seen in FIGS. 2 and 3, the front axle 24 not only connects the front wheels 16 and 18, but also engages the fulcrum 38 which includes a recess 60 formed at the extended end of the fulcrum. The recess receives and somewhat constrains the axle. The axle is also engaged by the tabs 34, 36. Each tab is in the form of a beam and extends away from the base. The tabs are flexible and have memories. Each tab also moves between two positions. A first position is shown in FIG. 2 where the tabs are slightly flexed by the axles so as to engender a small biasing force against the axles. A second, greater flexed position is shown in FIGS. 13–16 where a larger biasing force is engendered in the tabs against the axles. In essence, the tabs act as return springs for biasing the axles to their at rest center positions. Finally, each bracket has an end portion containing a slot such as the slots 62 and 64 of the brackets 30 and 32, respectively. As shown, the front axle is captured by the slots 62 and 64 and passes through them so that the axle is constrained to move within the confines of the slots. A similar arrangement exists for the rear axle 26. Each of the brackets 40, 42 has an end portion containing slots such as the slots 66, 68, respectively. The rear axle 26 is constrained by the two slots 66, 68 through which the axle passes. The rear axle is also received by a recess 70 of the fulcrum 48 and both of the biasing tabs 44, 46 also engage and bias the rear axle to the position shown in FIG. 2.

Figure 4:
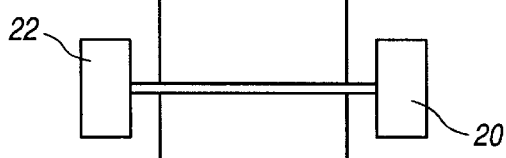
FIG. 4 is a diagrammatic plan view of the toy vehicle shown in FIGS. 1–3 in a straight ahead steering mode.
Figure 5:
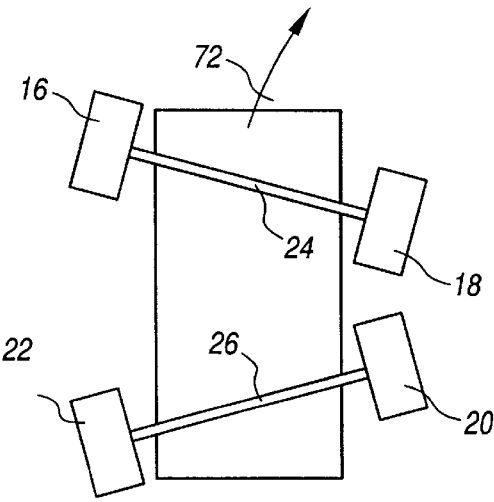
FIG. 5 is a diagrammatic plan view of the toy vehicle of FIGS. 1–3 showing a rightward turn.
Figure 6:
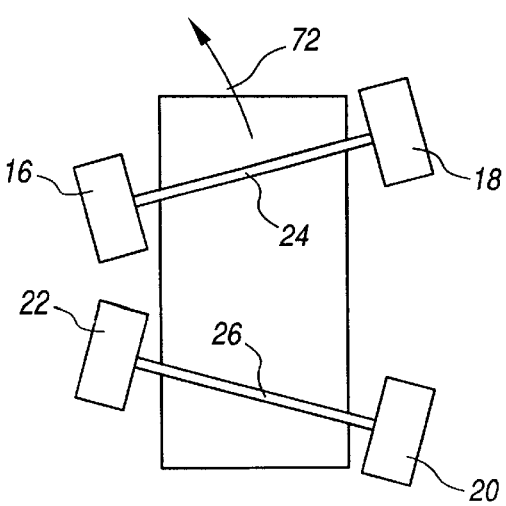
FIG. 6 is a diagrammatic plan view of the toy vehicle of FIGS. 1–3 showing a leftward turn.

Referring now to FIGS. 4, 5 and 6, there is illustrated the range of motions for the wheels. For purposes of direction, a forward direction is indicated by the arrow 72, a rightward direction is indicated by the arrow 74 and a leftward direction is indicated by the arrow 76. It is apparent that the toy vehicle is capable of being pushed in a straight ahead direction as indicated by the arrow 72. The toy vehicle may also be turned by providing a downward force on the body 12 (depicted by the vectors 120, 122) to one side or the other of the longitudinal axis 50. If the force is applied to the right side indicated by the vector 120, then the toy vehicle will tilt or incline to the right and the wheels will automatically assume the positions shown in FIG. 5. If the force is to the left of the longitudinal axis, then the vehicle will slant to the left and the wheels will automatically take the positions shown in FIG. 6. The limitation to movement of the wheels is provided by the constraint of the axles in the slots and the force applied. If, in addition to the tilt force, there is also a force pushing the vehicle forward than, in the situation shown in FIG. 5, the vehicle will turn in a rightwardly direction as depicted by the arrow 74, or as shown in FIG. 6, the vehicle will turn in a leftwardly direction as depicted by the arrow 76. It is noted that the front set of wheels turn in a direction opposite to the turn of the rear set of wheels. This will be explained below. It should also be understood that the positions of the wheels in FIGS. 5 and 6 are exaggerated for illustrative purposes.

Referring now to FIGS. 7 and 8, the brackets and their slots are shown in more detail. The front brackets are represented by the bracket 30 and the slot 62 which is formed in the end portion 90 of the bracket. As can be seen, the slots are elongated and located in an oblique manner, at an angle to the horizontal which may be represented by the longitudinal axis 50. The longitudinal axis of the slot is represented by the line 92 and it is rotated from the longitudinal axis 50 by about 45 degrees. In a similar manner, the rear bracket 40 has the slot 66 formed in its extended end 94 and it also is rotated from the longitudinal axis 50 by about 45 degrees. This is shown by the angular disposition of the longitudinal axis of the slot represented by line 96, compared to the horizontal longitudinal axis 50. It is also apparent that the relative angular disposition between the front slots represented by slot 62 and the rear slots represented by slot 66 is about 90 degrees. The different dispositions of these slots result in the opposite dispositions of the wheels during leftward and rightward turns as shown in FIGS. 5 and 6.

The simplicity of the invention is further shown by reference to FIGS. 9 and 10. The operation of the biasing tabs will be explained by referring to the front tab 34 and the rear tab 44. As shown, the tabs are in the first position where there is a slight biasing force in the direction of the vectors 100, 102 against the respective front and rear axles 24, 26. This results in the axles being aligned perpendicular to the longitudinal axis 50 and parallel to one another as shown in FIG. 4. However, during turns as shown in FIGS. 5 and 6, the axles move out of their perpendicular and parallel alignments. In the case where an axle moves against a tab in response to a vertical force on the vehicle, the tab is forced to flex in the direction of the arrows 104, 106 to their second positions. When this occurs the opposing biasing force engendered by the tab increases so that once the tilt force is removed from the toy vehicle, the tab which is now more highly flexed will force the axle to return to its perpendicular alignment relative to the longitudinal axis 50.

Referring now to FIG. 11, the fulcrum 38 represents itself and the rear fulcrum 48, which is essentially identical, in that the respective axle, such as the axle 24, received in the recess 60 is positioned to pivot around the fulcrum in response to tilt forces acting on the toy vehicle. Each axle pivots about the fulcrum to the extent allowed by the limits of their respective slots.

Referring now to FIG. 12, when the wheels are in a straight ahead alignment as shown in FIG. 4, each of the shafts is constrained by the fulcrum so it is positioned at about the mid-point of each of it corresponding slots. For example, the front axle 24 is biased with a relatively low force by the tabs 34, 36 and constrained by the fulcrum 38 so that the axle is positioned at about the middle of the slots 62, 64. The same is true of the rear axle 26. It is biased with a slight biasing force created by the tabs 44, 46 and is constrained by the fulcrum 48 to a position at about the mid-points of the two slots 66, 68.

During a right turn of the toy vehicle, such as shown in FIG. 5, the front axle 24 pivots around the fulcrum 38 so that it occupies a lower portion 62a of the slot 62 and an upper portion 64a of the slot 64, FIG. 13. When this happens, the portion of the axle that is to the left of the fulcrum pushes against the biasing tab 34 in the direction shown by the arrow 110 thus engendering a stronger biasing force acting on the axle causing it to return to the position shown in FIG. 4 once the tile force is removed. The rear axle 26 undergoes an opposite movement. The right portion of the axle moves to a upper portion 68a of the slot 68 while the left portion of the axle moves to a lower portion 66a of the slot 66, FIG. 14. When this happens, the left portion of the axle pushes the biasing tab 44 outwardly as shown by the arrow 112 thus engendering a stronger biasing force acting on the axle causing it to return to the position shown in FIG. 4 once the tilt force is removed.

Referring now to FIGS. 15 and 16, the locations of the axles for a leftward turn are shown. The front axle 24 pivots about the fulcrum 38 so that it is in a lower portion 64b of the slot 64 and in a upper portion 62b of the slot 62. When the axle pivots as just described, the tab 36 is flexed to its second position thereby engendering a larger biasing force on the axle to return it to a mid position in the slots once the tilt force is removed. The rear axle 26 pivots around the fulcrum 48 so that it is positioned in a lower portion 68b of the slot 68 and in an upper portion 66b of the slot 66. After this pivoting movement, the tab 46 is moved to its second position increasing the biasing force acting on the axle.

In operation, the toy vehicle 10, FIG. 1, may be pushed with a force acting along the direction of the vector 118 to achieve straight ahead rolling motion. When the pushing motion is also accompanied by a downward force as represented by the right arrow 120 or the left arrow 122, then the toy vehicle will make a rightward of leftward turn, respectively. For example if the operator of the toy vehicle applies a force having a component parallel to the vector 118 and another component parallel to the vector 120 (on the right side of the vehicle), then the vehicle will turn as depicted in FIG. 5 in the direction of the arrow 74. This is accomplished by the disposition of the wheels and axles as shown in FIG. 5 and as shown in FIGS. 13 and 14.

If the operator provides a force having a component parallel to the vector 118 and another component parallel to the vector 122 on the left side of the vehicle, then the vehicle will turn as shown in FIG. 6 in the direction of the arrow 76. The axles will assume the positions shown in FIG. 6 as well as in FIGS. 15 and 16. In the straight ahead mode as shown in FIG. 4 where the operator is providing a force parallel to the vector 118, the toy vehicle will move in the direction of the arrow 72 and the axles and wheels will be in the positions shown in FIGS. 4 and 12.

As mentioned, the toy vehicle shown in FIGS. 1–3 may have the base molded of a suitable synthetic resin so that all of the parts including the brackets, the tabs and the fulcrum may be molded in a single operation integral with the base. The wheels 16, 18, 20, 22 may also be molded of a suitable synthetic resin. The axles 24 and 26 will usually be made of metal. The body 12 may also be of metal or of a synthetic resin.

The present invention is a simple but elegant mechanism for having the wheels or other surface engaging elements turn left or right in response to a vertically directed tilt force on the vehicle having the mechanism. The mechanism has few parts and minimal movement. In the case of toys, most of the parts may be molded integrally so that costs are minimalized. Also, in the case of a toy, the entire vehicle may be molded as one piece except for the wheels and axles. Even for larger vehicles the mechanism remains simple with few parts. This self-turning or steering mechanism also provides enhanced play value in the case of a toy, or physical excitement in the case of a recreation or sport vehicle.

Figure 17:
FIG. 17 is a diagrammatic side elevation view of a toddler's push and go cart having the undercarriage of the present invention.
Figure 18:
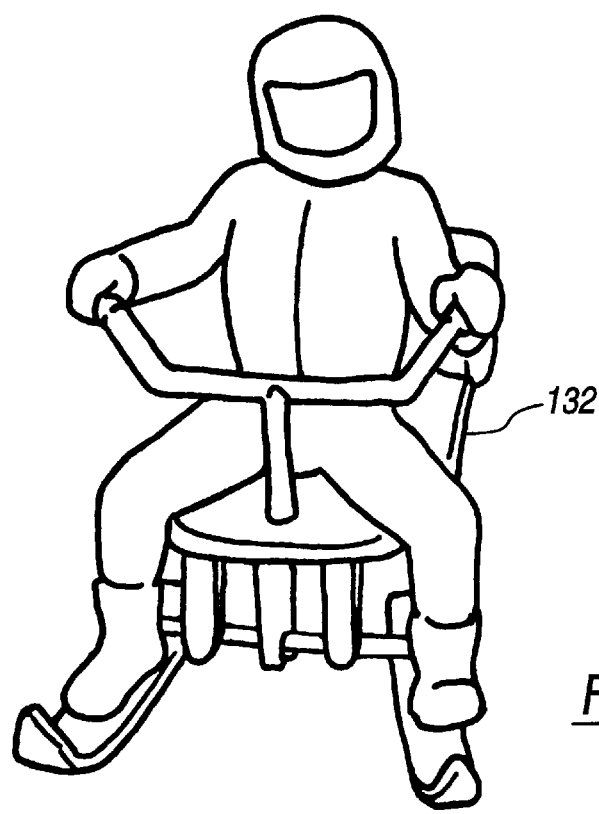
FIG. 18 is a perspective view of a motorized snow mobile having the undercarriage of the present invention.

The specification describes in detail an embodiment of the present invention. Other modifications and variations will, under the doctrine of equivalents, come within the scope of the appended claims. For example, the body may be of molded synthetic resin where the brackets, tabs and fulcrums are molded integrally with the body so that it becomes the base from which the other elements depend. In this circumstance, the base 14 is unnecessary. As shown in FIG. 17, the vehicle may be larger than a hand moveable toy truck, such as a toddlers' push and go cart 130 where forward motion is developed by the toddler's legs against the ground surface 131 and the tilt forces are developed by the toddler shifting his/her weight from one side to the other. Yet another vehicle is shown in FIG. 18. A snowmobile 132 for carrying an adult may also have an undercarriage as described hereinabove. In addition, the snowmobile may be motor driven and may be mounted to skis rather than to wheels. It is also to be understood that in addition to wheels and skis, any other surface engaging element could be used, such as tractor treads or sled runners. Even water borne vehicles may use the undercarriage described above. Still other alternatives will also be equivalent as will many new technologies. There is no desire or intention here to limit in any way the application of the doctrine of equivalents.

What is claimed is:

1. An undercarriage apparatus for a vehicle adapted to move on a surface comprising in combination:

a pair of spaced apart surface engaging elements;

an axle connecting said pair of spaced apart surface engaging elements;

a base having a bottom surface;

first and second spaced apart brackets mounted to said bottom surface of said base, each of said brackets having an extended end portion;

an oblique slot formed in said extended end portion of each of said brackets, each slot having a lower and an upper portion thereof wherein said axle passes through the slots formed in each of said brackets and is constrained to move within said slots;

a fulcrum mounted to said bottom surface of said base between said first and second spaced apart brackets and engaging said axle for allowing said axle to pivot about said fulcrum; and first and second biasing elements connected to said bottom surface of said base for biasing said axle, said first biasing element being located to one side of said fulcrum along said axle and said second biasing element being located to the other side of said fulcrum along said axle.

2. An apparatus as claimed in claim 1 wherein:

said base has a longitudinal axis; and said slots are disposed at about 45 degrees relative to said longitudinal axis.

3. An apparatus as claimed in claim 2 wherein:

each of said first and second biasing elements is moveable between a first position where said element is slightly flexed and a second position where said element is flexed to a greater extent than when in said first position thereby generating a larger biasing force.

4. An apparatus as claimed in claim 3 wherein:

when said axle is positioned in the lowest portion of a slot, the biasing element closest to said bracket having said slot is in the second position.

5. An apparatus as claimed in claim 4 wherein:

when said axle is positioned in the lowest portion of a slot, said pair of spaced apart surface engaging elements are turned in a direction away from the slot having said axle in the lowest portion thereof.

6. An apparatus as claimed in claim 5 wherein:

said axle is positioned at about the midpoint of said slots when each of said biasing elements is in the first position.

7. An apparatus as claimed in claim 6 wherein:

said fulcrum includes a recess for receiving said axle, said base being supported above said surface upon which said vehicle moves by said pair of spaced apart surface engaging elements, said axle and said fulcrum.

8. An apparatus as claimed in claim 7 wherein:

said first biasing element is located between said fulcrum and said first bracket; and said second biasing element is located between said fulcrum and said second bracket.

9. An apparatus as claimed in claim 1 including:

a second pair of spaced apart surface engaging elements;

a second axle connecting said second pair of spaced apart surface engaging elements;

third and fourth spaced apart brackets mounted to said bottom surface of said base spaced from said first and second brackets, said third and fourth brackets each having an extended end portion;

an oblique slot formed in said extended end portion of each of said third and fourth brackets, said second axle being passed through the slot formed in each of said third and fourth brackets;

a second fulcrum mounted to said base between said third and fourth spaced apart brackets and engaging said second axle for allowing said second axle to pivot about said second fulcrum; and third and fourth biasing elements for biasing said second axle, said third biasing element being located to one side of said second fulcrum along said second axle and said fourth biasing element being located to the other side of said second fulcrum along said second axle.

10. An apparatus as claimed in claim 9 wherein:

said slots in said first and said second brackets are arranged to be generally parallel to each other;

said slots in said third and said fourth brackets are arranged to be generally parallel to each other; and said slots in said first and said second brackets are aligned about 90 degrees away from said slots in said third and fourth brackets.

11. An apparatus as claimed in claim 10 wherein:

said slots are aligned about 45 degrees relative to a longitudinal axis of said base.

12. An apparatus as claimed in claim 11 wherein:

each of said first and second biasing elements are moveable between a first position where each of said elements is slightly flexed and a second position where each of said elements is flexed to a greater extent than when in said first position thereby generating a larger biasing force.

13. An apparatus as claimed in claim 12 wherein:

said surface engaging elements are turned from a direction generally in parallel alignment with the longitudinal axis of said base when said first mentioned axle pivots about said first mentioned fulcrum and said first mentioned axle is in the lower portion of one of said slots of said first and second brackets and in the upper portion of the other of said slots of said first and second brackets, and said second axle pivots about said second fulcrum and said second axle is in the lower portion of one of said slots of said third and fourth brackets and in the upper portion of the other of said slots of said third and fourth brackets.

14. A tilt and turn apparatus comprising:

a pair of spaced apart surface engaging elements;

an axle connecting said pair of spaced apart surface engaging elements;

a base;

first and second spaced apart brackets mounted to said base, each of said brackets having an extended end portion;

an oblique slot formed in said extended end portion of each of said brackets, each slot having lower and upper portions thereof wherein said axle passes through the slots formed in each of said brackets and is constrained to move along said slots;

a projection mounted to said base between said first and second spaced apart brackets and engaging said axle; and first and second biasing elements connected to said base for biasing said axle, said first biasing element being located to one side of said projection along said axle and said second biasing element being located to the other side of said projection along said axle.

15. An apparatus as claimed in claim 14 including:

a second pair of spaced apart surface engaging elements;

a second axle connecting said second pair of spaced apart surface engaging elements;

third and fourth spaced apart brackets mounted to said base spaced from said first and second brackets, said third and fourth brackets each having an extended end portion;

an oblique slot formed in said extended end portion of each of said third and fourth brackets, said second axle being passed through the slot formed in each of said third and fourth brackets;

a second projection mounted to said base between said third and fourth spaced apart brackets and engaging said second axle; and third and fourth biasing elements for biasing said second axle, said third biasing element being located to one side of said second projection along said second axle and said fourth biasing element being located to the other side of said second projection along said second axle.

16. An apparatus as claimed in claim 15 wherein:

said slots in said first and said second brackets are arranged to be generally parallel to each other;

said slots in said third and said fourth brackets are arranged to be generally parallel to each other;

said slots in said first and said second brackets are aligned about 90 degrees away from said slots in said third and fourth brackets;

each of said slots are aligned about 45 degrees relative to a longitudinal axis of said base;

each of said first and second biasing elements is moveable between a first position where said biasing element is slightly flexed and a second position where said biasing element is flexed to a greater extent than when in said first position thereby generating a larger biasing force;

said surfacing engaging elements are turned from a direction generally in parallel alignment with the longitudinal axis of said base when said first mentioned axle pivots about said first mentioned projection and said first mentioned axle is in the lower portion of one of said slots of said first and second brackets and in the upper portion of the other of said slots of said first and second brackets, and said second axle pivots about said second projection and said second axle is in the lower portion of one of said slots of said third and fourth brackets and in the upper portion of the other of said slots of said third and fourth brackets.

17. An apparatus as claimed in claim 16 wherein:

said vehicle may be pushed in a direction parallel to the longitudinal axis of said base by the application of a force on said vehicle in a direction parallel to the longitudinal axis; and said vehicle may be turned leftwardly and rightwardly from the direction of said longitudinal axis by applying a downward tilt force on the appropriate left portion or right portion of said vehicle.

18. An apparatus as claimed in claim 17 wherein:

when said vehicle is turned leftwardly said first mentioned axle is positioned in the upper portion of the slot in said bracket to the left side of said first mentioned projection and in the lower portion of the slot in said bracket to the right side of said first mentioned projection and the biasing element on the right side of said first mentioned projection is in the second position;

when said vehicle is turned rightwardly said first mentioned axle is positioned in the upper portion of the slot in said bracket to the right side of said first mentioned projection and in the lower portion of the slot in said bracket to the left side of said first mentioned projection and the biasing element on the left side of said first mentioned projection is in the second position.

19. An apparatus as claimed in claim 18 wherein:

when said vehicle is turned leftwardly said second axle is positioned in the upper portion of the slot in said bracket to the left side of said second projection and in the lower portion of the slot in said bracket to the right side of said second projection and the biasing element on the right side of said second projection is in the second position; and when said vehicle is turned rightwardly said second axle is positioned in the upper portion of the slot in said bracket to the right side of said second projection and in the lower portion of the slot in said bracket to the left side of said second projection and the biasing element on the left side of said second projection is in the second position.

20. A wheel mounting mechanism for causing wheels of a vehicle to turn in response to an off-center vertical force comprising:

a pair of spaced apart wheels;

an axle connecting said spaced apart wheels;

means having oblique spaced apart slots for constraining said axle to move within said slots;

means cooperating with said constraining means and located between said spaced apart slots for engaging said axle whereby said axle pivots about said engaging means in response to an off-center vertical force; and means operatively cooperating with said constraining means and said engaging means and having two parts, one part located to each side of said engaging means, for applying a biasing force on said axle, said biasing force of one of said two parts increasing upon the application of an off-center vertical force.

* * * * *